Jan. 5, 1926.  
C. R. GLEASON  
1,568,730  
MINNOW BUCKET  
Filed Feb. 1, 1924  
2 Sheets-Sheet 1
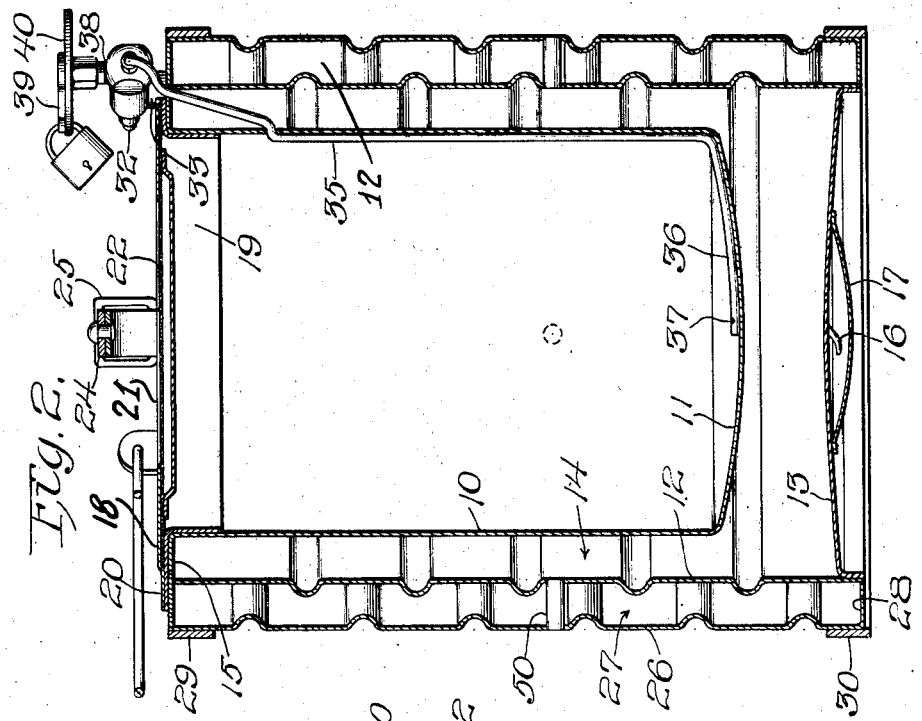
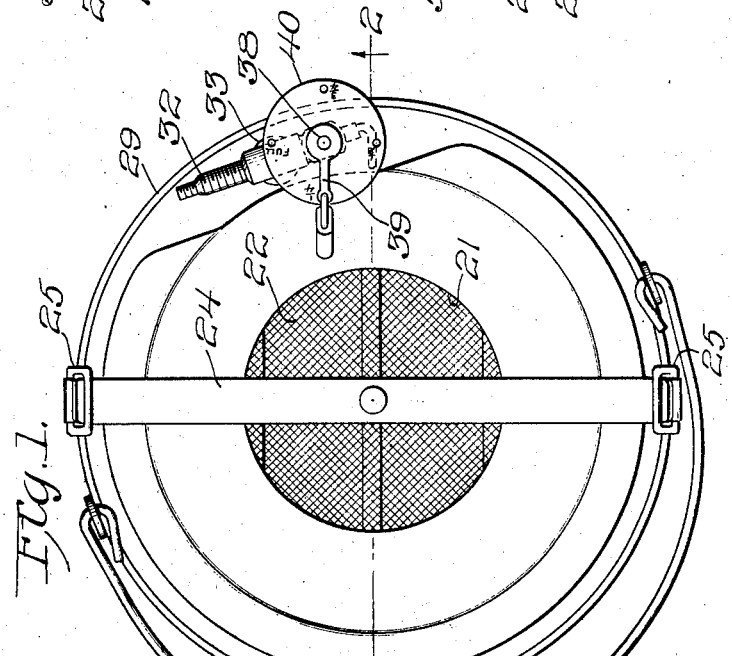
Inventor  
C. Roy Gleason  
by William L. Hall  
Atty.

Jan. 5, 1926. 1,568,730
C. R. GLEASON
MINNOW BUCKET
Filed Feb. 1, 1924 2 Sheets-Sheet 2
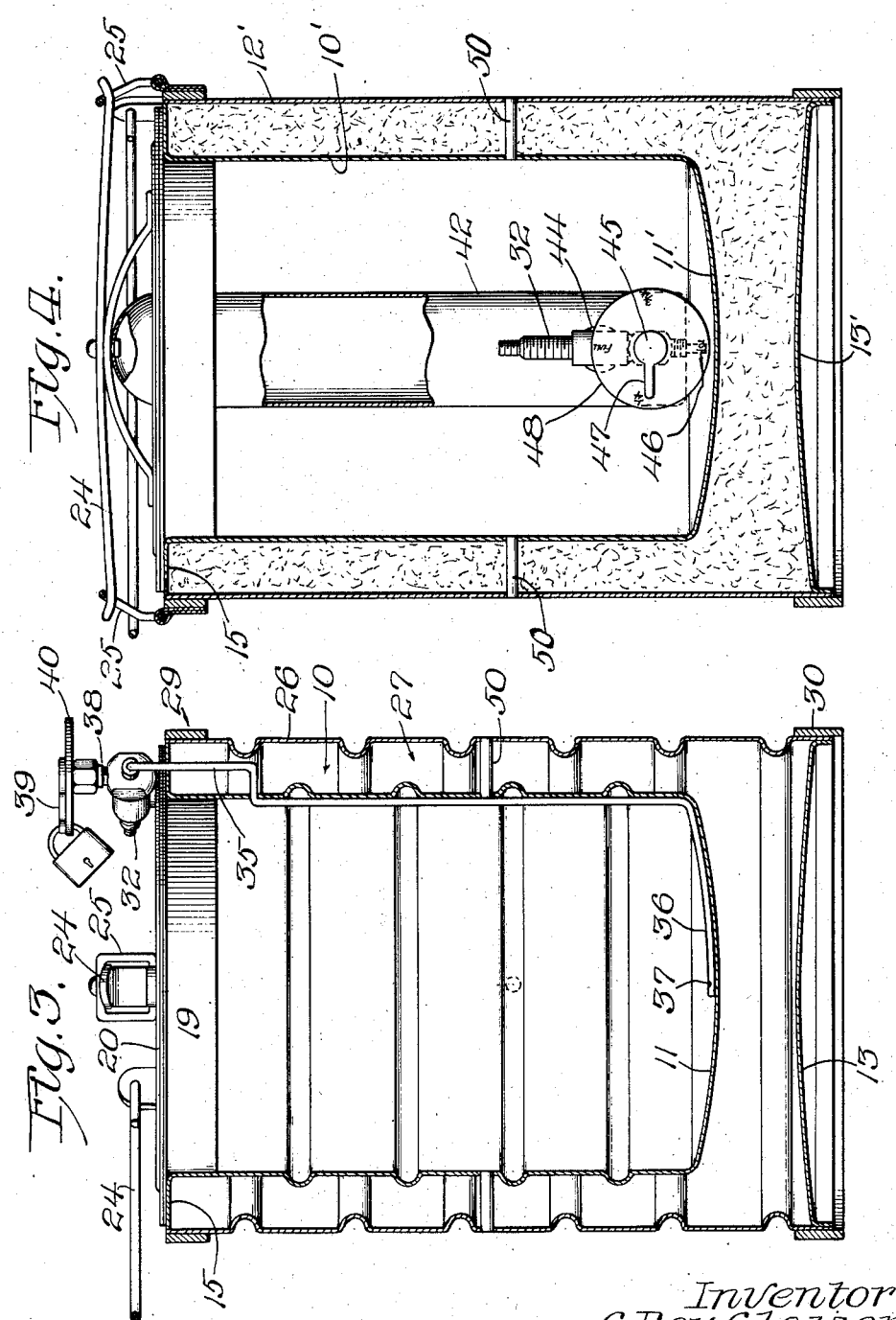
Inventor
C Roy Gleason
by William [signature]
Atty.

Patented Jan. 5, 1926.

1,568,730

UNITED STATES PATENT OFFICE.

C. ROY GLEASON, OF CHICAGO, ILLINOIS.

MINNOW BUCKET.

Application filed February 1, 1924. Serial No. 689,880.

*To all whom it may concern:*

Be it known that I, C. ROY GLEASON, a citizen of the United States, and a resident of Chicago, in the county of Cook and State of Illinois, have invented certain new and useful Improvements in Minnow Buckets; and I do hereby declare that the following is a full, clear, and exact description thereof, reference being had to the accompanying drawings, and to the characters of reference marked thereon, which form a part of this specification.

This invention relates to what may be termed a minnow bucket or receptacle adapted in one of its utilities for use by fishermen for carrying bait to the fishing grounds, and which may also be adapted in larger uses for carrying young fish from spawning grounds to and for stocking distant bodies of water.

In the illustrated embodiment of the invention, it is shown as adapted to a minnow bucket, and various structures are illustrated to indicate simple and more complex adaptation of the inventive idea to such minnow buckets.

A purpose of the invention is to provide a receptacle wherein the container for the fish and the water into which they are transported is so associated with a source of air under pressure, as a pressure tank, and constituting in operation a unitary part of the device, that air under pressure can be allowed to flow from the said tank or source at a predetermined rate and delivered to the bottom of the container so as to rise therethrough and aerate the water to furnish the necessary oxygen to the fish or minnows.

A further object of the invention is to construct a minnow bucket or receptacle for this general purpose in such manner and by such means that interchange of surrounding atmosphere to the water in the container will be slow, thereby enabling a body of water to be transported over a long distance at a desirable low temperature, permitting its temperature to gradually rise and avoiding the injurious effects of rapid changes of temperature of the water on the fish or minnows, and also avoiding the necessity of using ice to maintain the water properly cooled.

Other objects of the invention are to provide simple, efficient and inexpensive means for constructing a unitary device having the structural features and the utilities mentioned, and for regulating the discharge of air from the pressure tank to the container for the water and fish, and to otherwise improve and simplify receptacles of this general character.

The invention consists in the elements and combination of elements shown in the drawings and described in the specification, and is pointed out in the appended claims.

In said drawings:

Fig. 1 is a plan view of a minnow bucket embodying my invention, with parts broken away.

Fig. 2 is a section thereof on the line 2—2 of Fig. 1.

Fig. 3 is a section similar to Fig. 2 showing a modification.

Fig. 4 is another like section showing a still further modification.

In the construction shown in Figures 1 and 2, it embodies a container for water and minnows comprising an inner cylindrical shell 10 with its bottom 11, and an outer container comprising a larger and deeper shell 12 having a bottom 13. The space 14 between said containers is evacuated to form an evacuated jacket. As shown, the wall of the shell 10 has an out-turned flange 15 which is welded or otherwise secured to the top edge of the wall of the shell 12, and the jacket may be exhausted in a known way through a nipple 16 which, after exhaustion, is closed and turned back on the wall through which it extends, and may be covered by a protecting plate 17. The container is closed at its top by a removable cover 18 having an annular internal flange 19 which fits closely within the upper annular wall 10 and has an outstanding rim 20 that lies over the flange 15. Preferably, the cover is provided with an opening 21, across which is supported a screen 22 to permit the escape of air from the container and also to prevent the escape of the fish or minnow from the bucket in the event it is over-turned. Said cover may be clamped on the receptacle in any suitable manner, as by means of a spring bar 24, connected centrally to the cover and engaging at its ends loops 25 pivotally connected to the body of the receptacle.

In the construction shown in Figures 1 and 2, the tank for the air under pressure surrounds the jacket wall for the container and is so connected to the outer wall of the jacket as to constitute a unitary part of the bucket or receptacle, as shown in said figures. 26 designates an outer wall concentric to the axis of the container, between which and the wall 12 of the jacket is formed the tank space 27 for air which is to be held under pressure in said tank. A convient way of building a surrounding tank to a jacketed wall, and illustrated in Figures 1 and 2, is to extend the top flange 15 of the wall 10 outwardly over and to solder, weld or braze it to the top of the wall 26, to inturn the lower marginal portion 28 of the wall 26 against the jacket wall 12 and to solder, weld or braze them together, and to provide surrounding hoops or bands 29, 30 to closely embrace and to be welded, soldered or brazed to the outer tank wall, the lower band extending sufficiently below all walls to constitute a bottom support for the entire structure.

When employing a surrounding tank 27, as described, air may be charged by a suitable pump into said tank through a valve, designated as a whole by 32, and which may have the general form of a bicycle tire valve. The casing of said valve is connected to the tank space 27 through a tube 33, down turned, and the usual check element (not shown) of the valve structure 32 will prevent back flow of air from the tank in a known manner. Air is admitted from said tank to the container through a pipe 35 which leads through the vacuum jacket walls, and at the points of piercing of which the walls are made air tight about the pipe, and said pipe extends downwardly along the inner side of the wall 10 and has an inwardly turned branch 36 which is formed with a minute port 37 through which air escapes upwardly into the container, centrally thereof.

A valve 38 is interposed between the tank and said pipe 35, it being herein shown as connected in the rear end of the casing of the valve 32 to which the discharge pipe 35 is directly connected. The valve is shown as of a rotating needle type. It can be operated by a finger lever 39 to vary the quantity of air discharged from the tank to the container. A variation of valve opening will be necessary in order to secure uniform or substantially uniform aeration of the water between the high pressure point in the tank at the beginning of an outgoing trip and the progressively lowering pressures due to the escape of air to the container. The amount of air which should escape from the tank to the container may also be indicated by the number of fish or minnows in the container whose lives are to be sustained on a given trip.

As herein shown, the valve operating finger piece 39 sweeps over a dial 40 which can be graduated and marked to indicate different valve openings. The finger lever can be fastened to the disk to lock the valve in a given adjustment by a padlock, the hasp of which may pass through registering openings in said lever and disk.

In Figure 3 is illustrated a structure wherein the enclosing concentric tank is retained, however, without the insulating jacket to reduce the rate of interchange of heat from the surrounding atmosphere to the water in the container. The structure is, in respect of the pressure space 27 and the walls which enclose it, the general manner of attaching said walls together to produce air-tight joints, and the means for affording communication between the compressed air tank and container, similar to that shown in Figures 1 and 2, and similar parts bear like reference characters.

In both the constructions shown in Figures 1 to 3 inclusive, the walls which bound the pressure space are corrugated to strengthen said walls, against vacuum and pressure distortion in the construction shown in Figure 2, and against pressure distortion in the construction shown in Figure 3. Preferably, the corrugations extend circumferentially about the walls, with the corrugations of one wall staggered with respect to the corrugations of an adjacent wall. Such corrugations enable the walls to be made of lighter gauge metal than would be true if the walls were plain throughout.

In the modification shown in Figure 4 the air tank 42 has the form of a closed and airtight cylinder that depends from the cover 19 and is fastened thereto in any suitable manner, and is disposed centrally within the container. Said tank is adapted to be filled through the same type of valve 32 hereinbefore described, the casing of the valve being connected, through a tube 44, with the side of the tank near the lower end thereof. A valve 45 is interposed in said casing between the tube 44 and the outlet or container feed pipe 46 so as to discharge air at a predetermined quantity rate from the tank to the container; the valve being controlled by a finger lever 47 which may or may not be locked to the indicating disk 48, or in the manner shown in the other figures.

Instead of insulating the wall of the container by a vacuum jacket, as in the construction shown in Figures 1 and 2, the inner and outer walls 10′, 12′ respectively, are spaced to form an intermediate annular chamber that can be filled with any suitable insulating medium of a flocculent or granular character, such as lamp black and the like, which has a low coefficient of heat conduction. The said walls 10′, 12′, including the bottom walls 11′, 13′, are connected or fabricated together in a way similar to that hereinbefore described.

In the construction shown in Figures 1 to 3 inclusive, the walls bounding the pressure chambers may be mutually braced or strengthened by strut studs 50, as shown in said figures, and the walls 10', 12' of the construction shown in Figure 4 may be likewise braced for reinforcement purposes.

The tank may be charged from time to time, as necessary, with air by a simple hand pump such as a small tire pump, which may be readily carried as an accessory with the bucket or receptacle.

I claim:

1. A receptacle for the purpose set forth comprising a container for water, a tank for compressed air, both connected for support as a unitary device, a filling valve having a casing which communicates with said tank, said casing having an inlet and a separate minute bore conduit leading from said casing to said container, and a controlling valve in said casing between its connection to said tank and said conduit.

2. A receptacle for the purpose set forth comprising a container for water, a tank for compressed air, both connected for support as a unitary device, a filling valve having a casing which communicates with said tank, a minute bore conduit leading from said casing to said container, a controlling valve in said casing to control flow of air from the casing to said conduit, means to register the flow opening of said controlling valve, and means to lock said latter valve relatively to the registering means.

3. A receptacle for the purpose set forth comprising a container for water, a tank for compressed air, both connected for support as a unitary device, a filling valve having a casing which communicates with said tank, a minute bore conduit leading from said casing to said container, a controlling valve in said casing to control flow of air from the casing to said conduit, said valve including a rotative member having a radial actuating arm, and a fixed gauge disc over which said arm sweeps.

4. In a receptacle for the purpose set forth, a container enclosed by a vacuum jacket and a compressed air tank enclosing said vacuum jacket.

5. In a receptacle for the purpose set forth, a container enclosed by a vacuum jacket, a compressed air tank enclosing said vacuum jacket, and a communication between said tank and said container.

In witness whereof I claim the foregoing as my invention, I hereunto append my signature this 28th day of January, 1924.

C. ROY GLEASON.